June 1, 1965

D. B. BRINTON 3,186,109

EDUCATIONAL TESTING SYSTEM

Filed April 26, 1963

INVENTOR.
DAVID B. BRINTON
BY *M. Ralph Shaffer*
HIS ATTORNEY

June 1, 1965

D. B. BRINTON 3,186,109

EDUCATIONAL TESTING SYSTEM

Filed April 26, 1963

INVENTOR.
DAVID B BRINTON
BY *M. Ralph Shaffer*
HIS ATTORNEY

United States Patent Office 3,186,109
Patented June 1, 1965

3,186,109
EDUCATIONAL TESTING SYSTEM
David B. Brinton, 5000 Marilyn Drive,
Salt Lake City, Utah
Filed Apr. 26, 1963, Ser. No. 275,856
1 Claim. (Cl. 35—9)

The present invention relates to an educational testing system and, more particularly, presents a system, of unique character as hereinafter described, wherein answer selection to problems by examinees effects the energization of one or more of a series of lights, which indicates answer selection to the instructor alone in an instructor-controlled testing procedure, whereupon the instructor may convey to the individual examinees, individually, the correctness of their several responses.

Principal objects of the present invention are to permit a student to indicate his response to a multiple-choice type question in such a manner that his response is known only to the instructor and to himself; to permit a student to change his response as many times as he wishes to do so during the response period of the testing procedure; to permit the instructor to limit the response period for students by interrupting the student's control circuit and by simultaneously locking the student's final response; to permit a teacher to indicate to particular students whether their respective answers are correct or incorrect; to permit a teacher to divulge the correct response to the entire class by lighting the correct light on a teacher's console provided at the front of the class; to permit the teacher to reset all circuits prior to the response period for the succeeding multiple-choice questions; to permit the teacher or his assistant to score the responses of each individual student at the time when they are given; to permit incorporation of as many student stations as are needed in a particular class; to permit the teacher to observe students' response behavior, that is whether the responses are quick or slow, many or few, and so forth, this without student awareness of such observances; to permit the assistance of a non-professional aid for scoring the students taking a particular examination; to permit the teacher to receive simultaneously, individual responses from all of the students taking the examination; to provide for the rapid scoring of students' test responses; to permit the teacher to require every student to participate with the group taking an examination; to permit a teacher to hold the attention of every student in the class, this even during communication by the teacher to a particular student; to permit the conducting of an examination under conditions which minimize student collusion; to permit a teacher to maintain control of large numbers of students in the class, thus multiplying the effectiveness of a capable instructor; to permit a teacher to have the scores of each student taking an examination without having to read later the examination papers; to permit the student to know immediately whether his response to a particular question is correct; to permit a more efficient use of class period time without the whole class waiting during one student's recitation; to permit a teacher to progress with the examination and/or discussion necessary at a speed consistent with class progress; to permit a student to respond without feelings of inhibition before a class were he reciting orally; to permit the integrated use of other audio-visual teaching machines as may be employed; to permit the use of the equipment disclosed in either existing or new classrooms; to permit a teacher to signal to students the approach of a new response period for succeeding questions, conceivably both at the teacher's console and also at each student's station; and to permit the teacher to signal "starts" or response periods in a manner which will be unmistakably clear to the students in the class.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings in which:

FIGURE 1A is a detail of the relays designated "A" in FIGURE 1.

FIGURE 1B is a detail of the relay designated "B" in FIGURE 1.

FIGURE 1C is a detail of the relay designated "C" in FIGURE 1.

Figure 2:
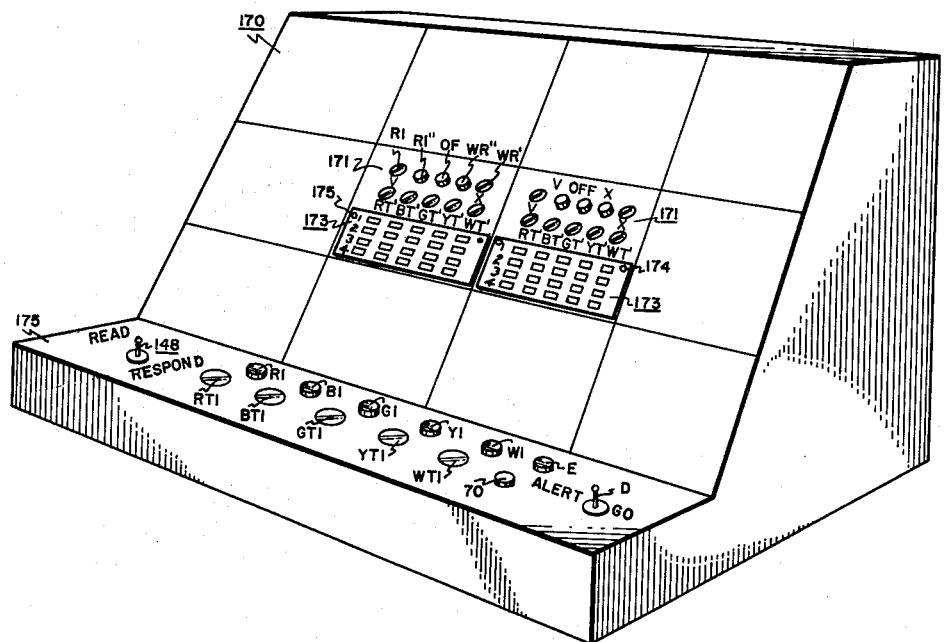

FIGURE 2 is a perspective view of an illustrative teacher's console which may be used and will generally be employed at the front of the class, with that portion of the console showing students' responses being out of the direct view of the class. For convenience of illustration, but two student-modules are indicated on the teacher's console; the actual number of modules there appearing, however, will be equal to the number of students' stations employed.

Figure 3:
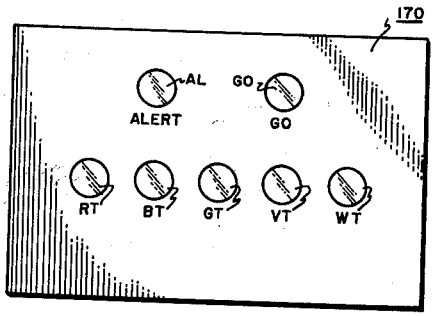

FIGURE 3 is an elevation of a preferred rear face of the console shown in FIGURE 2, which elevation will be in the direct line of vision of the students taking an examination.

Figure 4:
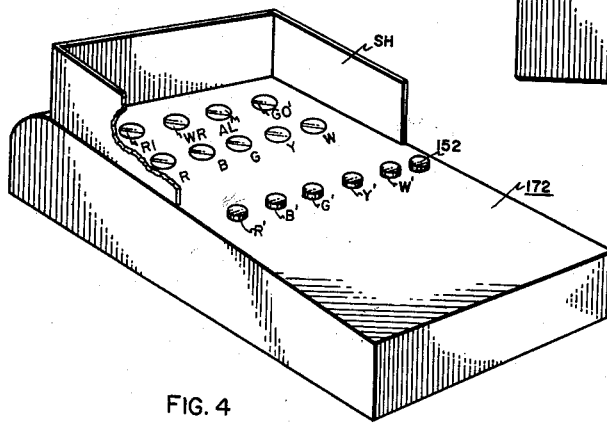

FIGURE 4 is an illustrative one of the students' stations to be employed in the examination, and is shown in perspective view and slightly broken away for convenience of illustration.

It is preferred that the present invention take the form of a low voltage circuit, with the components being used comprising a teacher's console and one or more students' stations, with the former including individual student modules, which are in number equal to the maximum number of students being tested by the system, and also individual relay units, one per student station, for convenience located in the base of the teacher's console.

Figure 1:
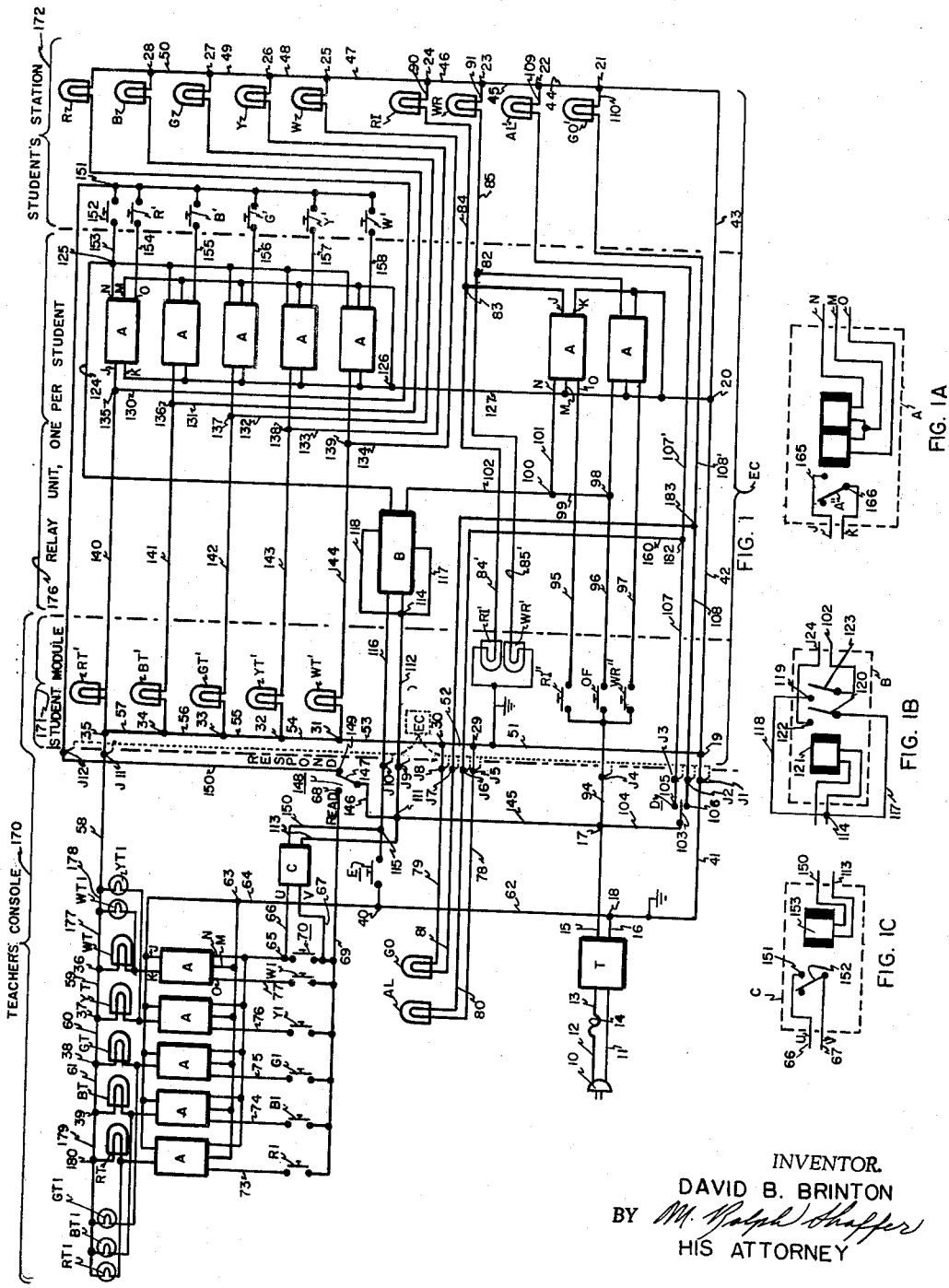
FIGURE 1 is a schematic diagram of the electrical circuitry of the present invention in a preferred embodiment thereof.

In FIGURE 1 input plug 10 is coupled to the input side of step-down transformer T by leads 11, 12, and 13 and through fuse 14 as shown. Leads 15 and 16 are connected across the output of transformer T and lead therefrom to respective junctions 17 and 18. Junctions 19–40 and 180 are common to junction 18 by leads 41–62, 177–179 as shown. Junction 63 is electrically connected to junction 40 by lead 64 and also connects to one side, that is the "J" side, of each of the relays A shown in the upper left-hand side of FIGURE 1. Likewise, junction 63 is connected to the center "M" connection of each of the relays A as shown. Lead N of each of the relays A in the upper left-hand corner of the figure is connected to common junction 65 which is common with the "U" terminal of relay C, by lead 66. For relays A connections M and O comprise a first input circuit and connections N and M a second input circuit therefor, see FIGURE 1A, with leads J and K comprises an "off-on" relay contact switch circuit. Lead 67 intercouples the "V" connection of relay C to contact 68 via common lead 69 which in turn connects to one side of each of the switches R1, B1, G1, Y1, and W1. "Off" switch 70 is a spring-loaded, push-button switch selectively closing the circuit between junction 65 and common lead 69. Leads "O" of each of the relays A in the upper left-hand side of the drawing are connected to the remaining side of respective switches R1, B1, G1, Y1, and W1, this by respective leads 73—77. Junction 29 is electrically connected to light AL by lead 78, and, correspondingly, junction 30 is connected by lead 79 to light GO. The remaining sides of lights AL and GO are coupled by leads 80 and 81 to junctions 182 and 183. One side of each of the lights RI, RI', WR, WR' is respectively connected to junctions 83, 82 by leads 84, 84', 85, 85', respectively, with the remaining sides being grounded, as shown. Lead 94 connects junction 17 to one side of each of the push-button switches R1", OF and WR". The remaining sides of these switches are connected by leads 95–97 to associated relays A as indicated, and, in addition, provide connection for lead 99 with junction 98. Junction 98 is connected by lead 99 to common junction 100 which in turn is connected to associated relays A and B by leads 101 and 102. Single-pole, double-throw switch D has an arm 103 connected by lead 104 to common junction 17 and is provided with a pair of contacts 105 and 106 which are respectively connected by leads 107, 107', and 108, 108' to one side of lights AL' and GO'. The remaining sides of these lights are connected by leads 109 and 110 to junctions 22 and 21, as shown. Common junction 111 is connected by leads 112 and 113 to relays C and B as indicated, the latter via common junction 114. Junction 115 interconnects switch E with relay B, as shown, by lead 116. Leads 117 and 118 interconnect common junction 114 with contact 119 and switch arm 120 of normally open double-pole relay B. The leads 112 and 116 are connected to the winding 121 of relay B (see FIGURE 1B), whereas contact 123 and relay arm 122 are connected by respective leads 102 and 124 to junction 100 and junction 125, respectively. The "N" sides of relays A in the upper right of the drawing are connected together and to common junction 125 as indicated. The "M" sides of the relays are connected together to common junction 126, and from thence via lead 127 ultimately to common junction 20 to which the M contacts of the two lower relays A are also directly connected. Junction 126 is also common to the "K" terminals of the same set of relays A. The "J" terminals of these relays are respectively connected by leads 130–134 to one side of lights R, B, G, Y, and W as indicated. The remaining side of these lights are connected to the respective junctions 28, 27, 26, and 25. The "J" connections of these relays A are also connected to junctions 135–139 which in turn are respectively connected by leads 140–144 to the remaining sides of lights RT', BT', GT', YT', and WT'. Lead 145 interconnects junction 17 with junction 111, and lead 146 leads from thence and connects to switch-arm 147 of switch 148, a single-pole double-throw switch, having in addition to contact 68 an additional contact 149. Contact 149 is connected by lead 150 to common junction 151 which connects one side of each of the momentary contact push-button switches 152, R', B', G', Y', and W'. The remaining sides of these switches are respectively connected by leads 153–158 to the "O" side of that group of relays A indicated.

Junction 115 is connected by lead 150 to core winding 153 of normally-open relay C. Arm 152 of relay C is directly connected to lead 67, as indicated. Leads 150 and 113 are connected to the core winding 153 of relay C as shown.

Relay A is a three-wire input relay of a bi-stable character. The contact leads M, N, and O lead to the winding means which has a common terminal M. Conduction of current through leads N and M will energize the relay so as to impose one condition upon contacts 165 and 166. When the current is removed from terminals N and M this condition will be maintained until conduction is achieved through leads M and O, at which time a change of state in the contacts 165 and 166 will take place. This will be explained more fully hereinafter.

Lights RT1, BT1, GT1, YT1, and WT1 are connected in parallel with lights RT, BT, GT, YT, and WT.

The circuit shown in FIGURE 1 operates as follows.

Power is supplied from an external source through plug 10 to achieve a stepped-down output voltage of, say 24 volts, from transformer T which appears across junctions 17 and 18. We shall consider that junction 18 is a ground which supplies grounds to the J side of the group of A relays in the upper left-hand side of the drawing and also supplies grounds to each of the following groups of lights: AL, GO; RT', BT', GT', YT', WT'; R, B, G, Y, W; RI, WR, AL', GO' and, via junction 19 and junction 35, lights RT, BT, GT, YT, WT, and lights RT1, BT1, GT1, YT1, and WT1. Common grounds are also supplied to terminal leads N of relays A in the upper left-hand corner of the drawing, and also to contact terminals M of the group of A relays in the upper right-hand side of the drawing, and ground at contact terminals K of the upper right-hand group of relays A.

It shall now be assumed that the examination period is just beginning. With the response switch 148 now preferably thrown by the teacher to "respond" position, the teacher calls the attention of the class to the impending response period by means of energizing an "alert" circuit, consisting of lights AL and AL', which is selectively energized by the teacher when the teacher now throws the arm 103 of switch D to the contact 105. Thus, not only will light AL' light, but light AL also, by virtue of the inclusion of jumper wire 160 which is common with lead 80; thus the student will be alerted both at the student station, or if he is looking toward the teacher's console, by the light AL at the teacher's console which faces the class.

The teacher now initiates the student response period by means of energizing a "go" circuit consisting of lights GO and GO' at the teacher's console and student's station, respectively. This is effected by the teacher switching the switch D from contact 105 to contact 106 to energize the "go" circuit and hence to supply power to leads 108' and 81. At the initiation of this period there will be given a multiple choice question which may either be read, put on a piece of paper, or shown on a blackboard or screen. Let us assume that the colors red, blue, green, yellow and white, are those of lights R, B, G, Y, and W, respectively, and with all counterparts RT, RT1, RT', BT, BT1, BT', and so forth, corresponding to answer choices 1, 2, 3, 4, and 5, respectively. Now since the "respond" side of switch 148 is closed through arm 147, power is supplied to the right-hand side of each of the push-button switches 152, R', B', G', Y', and W'. Let us assume that the student believes that the first of the multiple choice answers is correct. Thereupon he depresses push-button switch R' so as to energize its relay A. Now one side, that is at the K terminal, of the relays A is maintained at ground potential, as is also the several lights R–W, so that the resultant energization of the first, the uppermost relay A, will complete the power circuit through the relay so as to light lamp R at the student's station and lamp RT' on the student's module of the teacher's console.

Thus, the passing of current through switch R' completes the circuit through O and M of uppermost relay A so as to bring the arm A" of this relay into contact with the contact 165, thus completing the circuit between contacts 165 and 166.

Now, if the student wishes to change his response he may simply depress the bottom 152 so as to allow current to pass through leads M and N. Now, as has been heretofore explained, the relay A is a bi-stable relay, so that current passing through leads M and N will energize the opposite coil so as to urge arm A" out of contact with contact 165. This will operate to turn the lights R and RT' off. Subsequently, the student may depress any one of the other push-button switches B', G', Y', W', or return to choice R', so as to light the corresponding light through circuit closure as heretofore mentioned in connection with each of the relays A indicated in the upper right-hand side of the drawing.

Once the response period has terminated, the teacher will move switch arm 147 of switch 148 to the left so that arm 147 now comes in contact with contact 68. This removes power from each of the five relays A on the upper right-hand side of the drawing and thereby "freezes" the answer of the student to that light or lamp which is now turned on, since it must be remembered that relays A are bi-stable relays. At this time the teacher may note the answer on a particular student's module 171 and take note thereof, marking the card 173 accordingly. The teacher can now indicate the correct answer by pushing the appropriate push-button switch R1, B1, G1, Y1, W1, so as to light the correct lamp RT, BT, GT, YT, WT. If she inadvertently pushes the wrong push-button, then she may throw the bi-stable relay involved into a reverse condition by depressing push-button 70 and subsequently give the correct answer. These lights are indicated in FIGURE 3. Thus, the pupils now know immediately the correct answer. Furthermore, the teacher may now indicate to the pupil that his answer is either correct or incorrect by the teacher depressing on the student's module either push-button RI″ or WR″. If the student's answer has been incorrect, the teacher merely depresses push-button WR″, so as to energize lowermost relay A and thereby supply power to junction 82 and, hence, to light WR and WR′. If the student has chosen the correct answer, then switch RI″ may be closed so that power can be supplied lights RI and RI′ through the relay A associated with push-button switch RI″. The correct or incorrect indication may be turned off by the teacher depressing the "off" push-button OF so as to reverse the condition of the two relays A at the lower right-hand side of the drawing. The teacher may clear the machine for subsequent correction by merely depressing push-button E which operates to supply momentary energy to relay B and hence close arm 120 with contact 122 and arm 123 with contact 119, thereby supplying power to the seven relays A shown on the right-hand side of the drawing so as to return the relays to the initial electrical state present before the students' selections. Hence, button E is in fact a "reset" button. Shield SH of each student station 172 assures that instructor communication with the student is confidential.

In FIGURES 2 and 3 the teacher's console 170 is shown. Two of the student modules 171 thereon are indicated. Multiple choice score cards 173 may be supplied with corner apertures 174 which position the cards upon positioning support pins 175. Each of the student modules 171 are shown to include lights RI′, WR′, and switches RI″, OF, and WR″. Additionally, there are included the students' answer lights RT′, BT′, GT′, YT′, and WT′. Junctions J1–J12 in FIGURE 1 are connection points for each electrical circuit EC which will be used to accommodate each of the respective students at their respective positions in the classroom. It will be understood that duplicate circuits EC will be connected to the junctions J1–J12 in a manner as indicated with the circuit EC shown, so that each of the student modules 171 on the teacher console 170 and each student station used may be accommodated.

The teacher's control panel 175 of the teacher's console 170 as indicated in FIGURE 2 and is shown to include lights RT1, BT1, GT1, YT1 and WT1, which, if used, will be disposed in parallel with lights RT, BT, GT, YT and WT in FIGURE 2.

Switches 148 and D of FIGURE 1 are also illustrated as being on the teacher's panel 175 in FIGURE 2. Likewise included are push-button switches R1, B1, G1, Y1 and W1, plus push-button switch 70, which operates to clear a previous choice on the teacher's push-button panel.

Referring now to FIGURE 3, it will be seen that in addition to the display of lights RT, BT, GT, YT and WT, disposed directly in view of the students, there will also be included the lights AL and GO, the Alert and Go lights which signal the beginning of the alert period and response period, respectively.

FIGURE 4 illustrates a student station unit 172, the electrical circuitry of which is shown in FIGURE 1. The student's response switch push-buttons, that is the multiple choice selection buttons R′, B′, G′, Y′, and W′ are indicated, as is also clearing switch push-button 152. Lights R, B, G, Y, and W, corresponding to the possible multiple choice selections, are also shown. Likewise indicated are the lights RI and WR indicating, when energized, whether the previous selection is correct or incorrect. The lights AL′ and GO′ indicate at the student's station the alert period and the response period as indicated by the teacher at her control station in a manner as heretofore indicated. Light shield SH is preferably supplied each individual student station 172 and is of such configuration and dimension as to prevent neighboring students from observing answer selection by a particular student.

While the lights have been identified by color, R referring to red, B to blue, G to green, Y to yellow, and W to white, it will be understood that the lights may be numbered or provided with other indicia which indicate students' particular responses and the correctness thereof.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

In an educational testing system for simultaneously testing a number of students, and including, in combination, a plural separate students' stations, each of said stations including plural, manually actuatable momentary contact switch means individual returnable actuation of a selected one of which, by students at said stations, effects answer selection to a respective, multiple-choice type question given to said students, a teacher's console physically remote from but electrically connected to each of said students' stations and including student modules corresponding to and electrically connected with respective ones of said students' stations, each of said modules including a series of light means electrically coupled individually to respective ones of said manually actuatable switch means and responsive to the electrical condition thereof for emitting illumination, visual to the person giving the examination, in accordance with answer selection made by the individual students by switch means actuation of said switch means, said console including manually actuatable electrical circuit means for locking answer selection by said students with respect to a particular question, as evidenced by discrete light energization, to remove control of said light means from said students' stations, as desired, an improvement for each of said student stations comprising plural, bi-stable relay means each having first and second input circuits and an output relay contact circuit, each of said bi-stable relay means being so constructed and arranged that said output relay contact circuit is closed and remains closed during and after energization of said first input circuit and said output relay contact circuit is opened and remains open after energization of said second input circuit, a source of electrical power, said momentary contact switch means being respectively coupled between said source of power and said first input circuits, said actuatable electrical circuit means comprising a selection cancelling switch means coupled between said power source and said second input circuits, each of said output relay contact circuits being interposed between said source of power and respective ones of said light means of a respective one of said student modules; and said console manually actuatable electrical circuit means comprising selection locking switch means disposed upon said teacher's console and interposed between said power source and said momentary contact switch means and selection cancelling switch means for selectively disconnecting said power source simultaneously from all of said momentary contact switch means and said selection cancelling switch means of all of said student stations.

References Cited by the Examiner
UNITED STATES PATENTS

| | | | |
|---|---|---|---|
| 2,050,805 | 8/36 | Pumar | 35—9 |
| 2,562,179 | 7/51 | Dorf | 35—48 |
| 2,654,163 | 10/53 | Reynolds | 35—9 |
| 2,738,595 | 3/56 | John et al. | 35—48 |
| 2,965,975 | 12/60 | Briggs | 35—9 |

JEROME SCHNALL, *Primary Examiner.*